United States Patent
Kinouchi et al.

(12)

(10) Patent No.: US 6,372,817 B1
(45) Date of Patent: Apr. 16, 2002

(54) FRICTION MATERIAL COMPOSITION, PRODUCTION OF THE SAME AND FRICTION MATERIAL

(75) Inventors: Shigetoshi Kinouchi; Yasuhiro Hara; Junya Yamaguchi, all of Hitachi (JP)

(73) Assignee: Hitachi Chemical Company, Ltd., Tokyo (JP)

( * ) Notice: Subject to any disclaimer, the term of this patent is extended or adjusted under 35 U.S.C. 154(b) by 0 days.

(21) Appl. No.: 09/515,523

(22) Filed: Feb. 29, 2000

(51) Int. Cl.$^7$ .................................................. C08J 5/14
(52) U.S. Cl. ........................................ 523/157; 524/15
(58) Field of Search .......................................... 523/157

(56) References Cited

U.S. PATENT DOCUMENTS 4,119,591 A * 10/1978 Aldrich ..................... 260/17.2
5,083,643 A * 1/1992 Hummel ..................... 188/251
5,407,036 A * 4/1995 Hummel ..................... 188/250

FOREIGN PATENT DOCUMENTS

JP      6-23391      3/1994

* cited by examiner

Primary Examiner—Paul R. Michl
(74) Attorney, Agent, or Firm—Armstrong, Westerman & Hattori, LLP

(57) ABSTRACT

A friction material composition comprising (a) a fibrous material, (b) a binder containing a liquid rubber and (c) a friction regulator containing cashew dust is produced by coating the cashew dust with the liquid rubber, adding the fibrous material, remaining binder other than the liquid rubber and remaining friction regulator other than the cashew dust to the cashew dust coated with the liquid rubber, and then mixing.

17 Claims, 1 Drawing Sheet

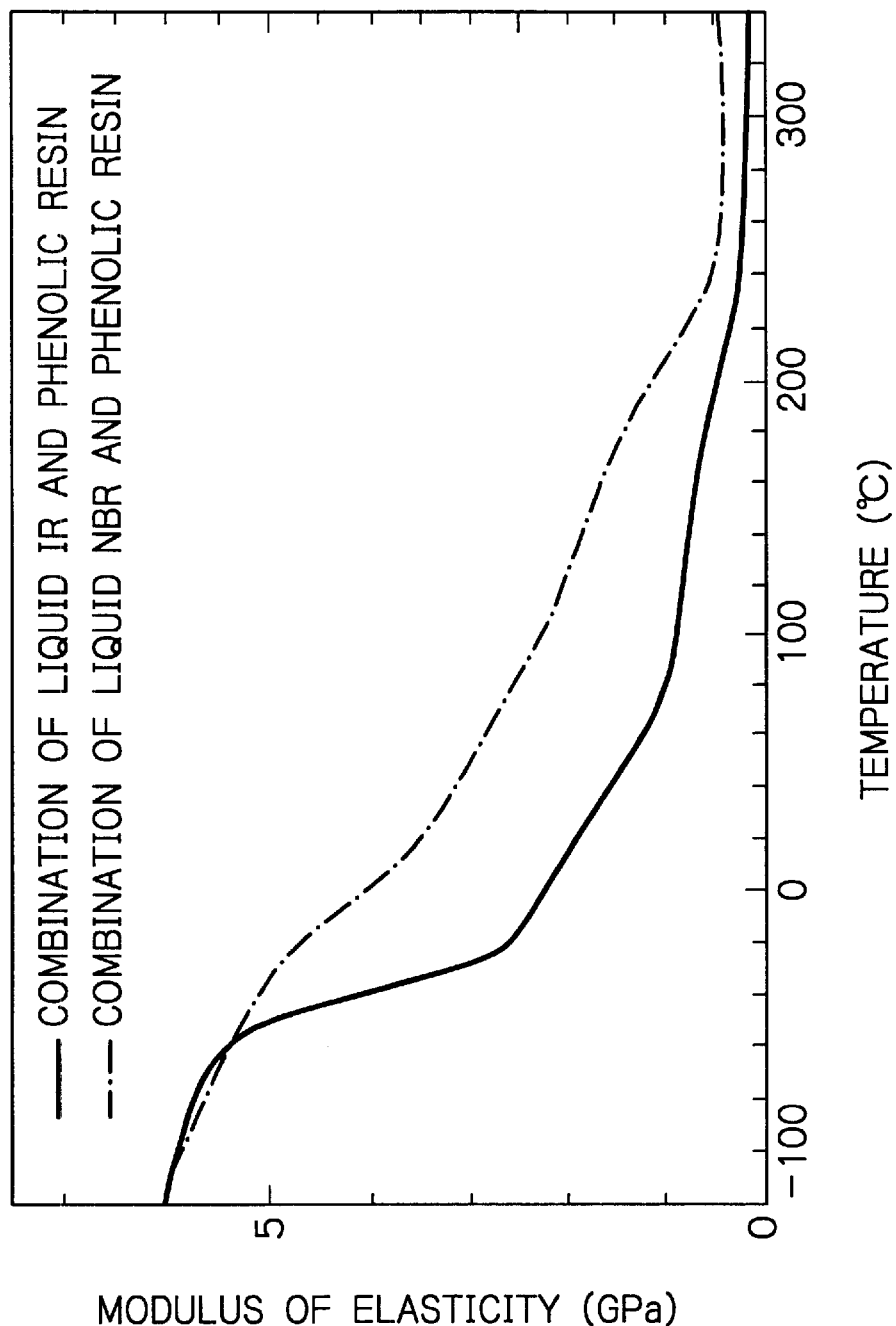

FRICTION MATERIAL COMPOSITION, PRODUCTION OF THE SAME AND FRICTION MATERIAL

BACKGROUND OF THE INVENTION (a) Field of the Invention

The invention relates to a friction material composition suitable for the production of friction materials such as disc pads or brake linings to be used to brake cars, railroad vehicles and various industrial machines. It also relates to a method of producing a friction material composition and to friction materials made from the friction material compositions.

(b) Description of the Related Art

In cars, railroad vehicles and various industrial machines, friction materials are used to brake them. Friction materials mainly used at present are non-asbestos disc pads, which, as disclosed in Japanese Patent Application Examined publication No. 59-4462 and Japanese Patent Application Non-examined Publication No. 6-184525, contain as reinforcing fibers mixtures of various fibers, for example, metal fiber such as steel fiber, brass fiber or copper fiber, organic fiber such as acrylic fiber, aramid fiber or phenolic fiber, and inorganic fiber such as rock wool, potassium titanate fiber, alumina.silica fiber or carbon fiber.

When dry-mixed, the conventional non-asbestos friction materials suffer from the defect that their components, particularly cashew dust, are apt to drop off. Cashew dust has a larger mean particle sizes of 30 to 400 $\mu$m than other components, and it is apt to drop off. The dropping of cashew dust adversely affects the uniformity of friction materials in their friction property, abrasion resistance and mechanical properties. Further, if the aggregates of the dropped cashew dust are mixed into friction materials, cracks will start from the portions containing the aggregates.

A common means for solving the problems is to prevent the components from dropping off by coating cashew dust with cashew nut shell oil or linseed oil or by employing wet mixing techniques using organic solvents or rubber latex.

As to the former method, the coefficients of viscosity of cashew nut shell oil and linseed oil ranging from 0.1 to 3 Pa·s (100 to 3,000 cP) are too low to form coating having adhesive power enough to disperse cashew dust sufficiently, and the duration of the adhesive power of the coating is only about three days. The latter method can achieve good dispersion, but involves problems in that drying is required to remove the solvents, which increases the time and cost of the production of powder mixtures and complicates the production steps.

SUMMARY OF THE INVENTION

An object of the invention is to provide a friction material composition which effectively prevents cashew dust from dropping off by using a coating material having adhesive power of long duration and can form friction materials free of the local aggregation of cashew dust.

Accordingly, the invention provides a friction material composition, comprising (a) a fibrous material, (b) a binder containing a liquid rubber and (c) a friction regulator containing cashew dust, the cashew dust being coated with 3 to 17 parts by weight of the liquid rubber relative to 100 parts by weight of the cashew dust.

Another object of the invention is to provide a method of producing a friction material composition, which effectively prevents the dropping of cashew dust by using a coating material having adhesive power of long duration, and gives a friction material composition suited to the production of friction materials free of local aggregation of cashew dust.

Accordingly, the invention provides a method of producing a friction material composition comprising (a) a fibrous material, (b) a binder containing a liquid rubber and (c) a friction regulator containing cashew dust, comprising coating the cashew dust with the liquid rubber, adding the fibrous material, remaining binder other than the liquid rubber and remaining friction regulator other than the cashew dust to the cashew dust coated with the liquid rubber, and then mixing.

Another object of the invention is to provide friction materials which are free of local aggregation of cashew dust.

Accordingly, the invention provides a friction material produced by molding with heat under elevated pressure the friction material composition of the invention, and a friction material produced by molding with heat under elevated pressure the friction material composition produced by the method of the invention.

BRIEF DESCRIPTION OF THE DRAWING

FIG. 1 is a graph showing the relationship between the modulus of elasticity of friction material compositions and temperature.

DESCRIPTION OF THE PREFERRED EMBODIMENTS

In the friction material composition of the invention, the content of the liquid rubber coating cashew dust is 3 to 17 parts by weight, preferably 5 to 15 parts by weight, more preferably 8 to 12 parts by weight relative to 100 parts by weight of cashew dust. If it is less than 3 parts by weight, the adhesive power of the coating will be insufficient to prevent the dropping off of cashew dust, failing to take the objective effect. If it is more than 17 parts by weight, cashew dust will aggregate due to the strong adhesive power of the liquid rubber and become difficult to disperse, causing local aggregation.

Examples of liquid rubbers usable in the invention include liquid isoprene rubber (liquid IR), liquid nitrile-butadiene rubber (liquid NBR), liquid styrene-butadiene rubber (liquid SBR), liquid acrylic rubber, liquid natural rubber and liquid chloroprene rubber. The preferred among the above described various liquid rubbers is liquid IR. As compared with other liquid rubbers such as liquid NBR and liquid SBR, liquid IR is less compatible and crosslinkable with thermosetting resins such as phenolic resin, and is therefore suitable for producing friction materials with lower modulus of elasticity and reducing squealing effectively.

The coefficients of viscosity of the liquid rubber as measured at 20° C. is preferably 10 to 2,000 Pa·s (10,000 to 2,000,000 cP), more preferably 10 to 1,000 Pa·s (10,000 to 1,000,000 cP), more preferably 10 to 500 Pa·s (10,000 to 500,000 cP), more preferably 10 to 100 Pa·s (10,000 to 100,000 cP), particularly preferably 30 to 80 Pa·s (30,000 to 80,000 cP), most preferably 40 to 60 Pa·s (40,000 to 60,000 cP). Cashew dust cannot be coated sufficiently with liquid rubbers of lower coefficients of viscosity and tends to drop off, while cashew dust coated with liquid rubbers of higher coefficients of viscosity may tend to aggregate and become difficult to disperse, thereby causing local aggregation.

To prevent squealing and cracking, cashew dust preferably has a mean particle size of 50 to 800 $\mu$m, more preferably 80 to 600 $\mu$m, particularly preferably 100 to 500 $\mu$m.

As to the method of coating cashew dust with the liquid rubber, kneading under elevated pressure using a kneader is preferable to coat cashew dust uniformly. The coating generally maintains its adhesive power for about 30 days.

To prevent squealing and cracking, the friction material composition preferably contains 3 to 30% by weight, more preferably 5 to 25% by weight, particularly preferably 10 to 20% by weight of cashew dust coated with the liquid rubber, based on the whole quantity of the friction material composition.

The friction material composition of the invention may be applicable for either semi-metallic friction materials containing steel fiber or non-steel friction materials containing no steel fiber, and its components are not particularly limited, provided the cashew dust coated with a liquid rubber is contained.

In general, the components of the friction material composition of the invention may be selected from known materials.

For example, the fibrous material to be used in the invention may be selected from known fibrous materials, for example, metal fibers such as steel fiber, brass fiber and copper fiber, organic fibers such as aramid fiber, acrylic fiber and phenolic fiber and inorganic fibers such as wollastonite fiber, ceramic fiber, rock wool, potassium titanate fiber and carbon fiber. These fibers may be used individually or in combination.

The binder to be used in the invention may be selected from known binder materials, provided it contains a liquid rubber as an essential binder. For example, the binder to be used in the invention may comprise a thermosetting resin selected from known thermosetting resins such as phenolic resin, epoxy resin, melamine resin and cashew resin, and a liquid rubber selected from known liquid rubber compositions such as liquid isoprene rubber (liquid IR), liquid nitrile-butadiene rubber (liquid NBR) and liquid styrene-butadiene rubber (liquid SBR).

The friction regulator to be used in the invention may be selected from known friction regulators, provided it contains cashew dust as an essential friction regulator. Examples of usable friction regulators include organic friction regulators such as cashew dust and rubber dust (e.g. NBR dust), inorganic friction regulators such as barium sulfate, graphite, diantimony trisulfide, zeolite, mica, zirconia, silica, alumina, calcium carbonate and magnesium carbonate, and optional metal powder such as brass powder and copper powder. These friction regulators may be used individually or in combination.

The quantity of the fibrous material in the friction material composition of the invention is preferably 30 to 50% by weight, more preferably 35 to 45% by weight based on the whole quantity of the friction material composition. The quantity of the binder is preferably 10 to 18% by weight, more preferably 12 to 15% by weight based on the whole quantity of the friction material composition. The friction material composition preferably contains both an organic friction regulator and an inorganic friction regulator, and may further contain metal powder according to demands. The quantity of the organic friction regulator is preferably 3 to 18% by weight, more preferably 8 to 13% by weight based on the whole quantity of the friction material composition. The quantity of the inorganic friction regulator is preferably 25 to 45% by weight, more preferably 30 to 40% by weight based on the whole quantity of the friction material composition.

The quantity of the optional metal powder, if any, is preferably 10 to 30% by weight, more preferably 15 to 25% by weight based on the whole quantity of the friction material composition.

The components as described above are used so that the whole quantity of the friction material composition becomes 100% by weight.

Friction materials free of the local aggregation of cashew dust are obtainable by using the friction material composition of the invention, because the dropping of cashew dust is reduced and the coating of the liquid rubber on cashew dust maintains its adhesive power for a long time.

The method of the invention is for producing a friction material composition comprising (a) a fibrous material, (b) a binder containing an liquid rubber and (c) a friction regulator containing cashew dust, and comprises coating the cashew dust with the liquid rubber, adding the fibrous material, remaining binder other than the liquid rubber and remaining friction regulator other than the cashew dust to the cashew dust coated with the liquid rubber, and then mixing.

The fibrous material, binder and friction regulator to be used in the method may be selected from fibrous materials, binders and friction regulators which are known in the art of friction materials, and examples and preferred examples thereof are the same as those described for the friction material composition of the invention.

In this method, first cashew dust is coated with a liquid rubber. To form uniform coating on the surface of cashew dust, it is preferable to knead a mixture of cashew dust and the liquid rubber under elevated pressure by using a kneader. The kneading is preferably carried out at ambient temperature, for example, 0 to 50° C., under elevated pressure, for example 0.1 to 1.0 MPa, more preferably 0.3 to 0.7 MPa, for 1 to 15 minutes, more preferably 3 to 10 minutes. The coating of the liquid rubber generally maintains its adhesive power for about 30 days. The quantity of the liquid rubber to be used for coating cashew dust is preferably 3 to 17 parts by weight, more preferably 5 to 15 parts by weight, particularly preferably 8 to 12 parts by weight relative to 100 parts by weight of cashew dust.

Then the fibrous material, remaining binder and remaining friction regulator are added to and mixed with the cashew dust coated with the liquid rubber. The mixing is preferably carried out by a dry-mixing method. For example, the cashew dust coated with the liquid rubber, the fibrous material, remaining binder and remaining friction regulator are mixed with a mixer at a rotation number of 2,000 to 4,000 $min^{-1}$ at 0 to 60° C. for 2 to 15 minutes.

The quantities of the fibrous material, binder and friction regulator to be used in the method of the invention are preferably such that the product friction material composition contains 30 to 50% by weight, more preferably 35 to 45% by weight of the fibrous material, 10 to 18% by weight, more preferably 12 to 15% by weight of the binder, 3 to 18% by weight, more preferably 8 to 18% by weight of the organic friction regulator, and 25 to 45% by weight, more preferably 30 to 40% by weight of the inorganic friction material, all based on the whole quantity of the friction material composition. The quantity of the optional metal powder, if any, is preferably such that the product friction material composition contains 10 to 30% by weight, more preferably 15 to 25% by weight based on the whole quantity of the friction material composition.

According to the method of the invention, the dropping of cashew dust can be reduced, and the cashew dust coated with the liquid rubber maintains its adhesive power for a long time. That is, by the method of the invention, friction material compositions capable of forming friction materials free of local aggregation of cashew dust can be produced.

The friction material of the invention is produced by molding with heat under elevated pressure the friction material composition of the invention or the friction material composition produced by the method of the invention. For example, a friction material composition is preformed before molding with heat and elevated pressure. For example, preforming is carried out by placing the friction material composition into a mold and then molding it into the shape of a friction material by pressing under a pressure of 10 to 40 MPa for 2 to 15 seconds.

A backplate and the preformed product are placed in a mold, and molded with heat under elevated pressure. The temperature of molding with heat under elevated pressure is preferably 130 to 170° C., more preferably 140 to 160° C. The pressure of molding with heat under elevated pressure is preferably 30 to 60 MPa, more preferably 45 to 55 MPa. The time of molding with heat under elevated pressure is preferably 3 to 10 minutes, more preferably 4 to 8 minutes.

The molded product is then preferably heated at 100 to 300° C., more preferably 150 to 250° C., for 2 to 8 hours, more preferably 3 to 6 hours.

After heating, the resulting friction material is optionally scorched to remove the organic components exposed on its surface. The scorching may be carried out by any method, for example, by pressing a heated plate against the friction material, heating its surface directly with flame of a gas burner or heating with radiant heat, such as far infrared rays. The scorching conditions depend on the materials of the friction material.

Being produced by using liquid rubber-coated cashew dust having adhesive power of long duration, the friction materials of the invention are free of the local aggregation of cashew dust and are suitable for industrial applications.

EXAMPLES 1 TO 5 AND COMPARATIVE EXAMPLES 1 AND 2

Example 1

100 parts by weight of cashew dust and 10 parts by weight of a liquid IR with a coefficient of viscosity of 30 Pa·s (30,000 cP) as measured at 20° C. were kneaded for 5 minutes with a kneader at a pressure of 49 MPa, to coat the cashew dust with the liquid IR. The coated cashew dust and the components given in Table 1 were mixed with a mixer for 4 minutes at a rotation speed of 3,000 r/min, to produce a friction material composition A.

Example 2

100 parts by weight of cashew dust and 3 parts by weight of a liquid IR with a coefficient of viscosity of 30 Pa·s (30,000 cP) as measured to 20° C. were kneaded for 5 minutes with a kneader at a pressure of 49 MPa, to coat the cashew dust with the liquid IR. The coated cashew dust and the components given in Table 1 were mixed with a mixer for 4 minutes at a rotation speed of 3,000 r/min, to produce a friction material composition B.

Example 3

100 parts by weight of cashew dust and 17 parts by weight of a liquid IR with a coefficient of viscosity of 30 Pa·s (30,000 cP) as measured to 20° C. were kneaded for 5 minutes with a kneader at a pressure of 49 MPa, to coat the cashew dust with the liquid IR. The coated cashew dust and the components given in Table 1 were mixed with a mixer for 4 minutes at a rotation speed of 3,000 r/min, to produce a friction material composition C.

Comparative Example 1

100 parts by weight of cashew dust and 1 parts by weight of a liquid IR with a coefficient of viscosity of 30 Pa·s (30,000 cP) as measured at 20° C. were kneaded for 5 minutes with a kneader at a pressure of 49 MPa, to coat the cashew dust with the liquid IR. The coated cashew dust and the components given in Table 1 were mixed with a mixer for 4 minutes at a rotation speed of 3,000 r/min, to produce a friction material composition D.

Comparative Example 2

100 parts by weight of cashew dust and 20 parts by weight of a liquid IR with a coefficient of viscosity of 30 Pa·s (30,000 cP) as measured at 20° C. were kneaded for 5 minutes with a kneader at a pressure of 49 MPa, to coat the cashew dust with the liquid IR. The coated cashew dust and the components given in Table 1 were mixed with a mixer for 4 minutes at a rotation speed of 3,000 r/min, to produce a friction material composition E.

Example 4

100 parts by weight of cashew dust and 10 parts by weight of a liquid NBR with a coefficient of viscosity of 250 Pa·s (250,000 cP) as measured at 20° C. were kneaded for 5 minutes with a kneader at a pressure of 49 MPa, to coat the cashew dust with the liquid NBR. The coated cashew dust and the components given in Table 1 were mixed with a mixer for 4 minutes at a rotation speed of 3,000 r/min, to produce a friction material composition F.

Example 5

100 parts by weight of cashew dust and 10 parts by weight of a liquid SBR with a coefficient of viscosity of 250 Pa·s (250,000 cP) as measured at 20° C. were kneaded for 5 minutes with a kneader at a pressure of 49 MPa, to coat the cashew dust with the liquid SBR. The coated cashew dust and the components given in Table 1 were mixed with a mixer for 4 minutes at a rotation speed of 3,000 r/min, to produce a friction material composition G.

The friction material compositions A, B, C, D, E, F and G produced in Examples 1 to 3, Comparative Examples 1 and 2 and Examples 4 and 5 were preformed respectively by placing each friction material composition in a mold and pressed at room temperature for 5 seconds under a pressure of 25 MPa. A backplate for a disc pad and each preformed product were placed in a mold, and molded with heat under elevated pressure for 5 minutes at 152.5±2.5° C. at a pressure of 49 MPa. The molded product was then heated for 5 hours at 200° C., cooled, polished, and subjected to surface-scorching at 470±10° C. for 5 minutes, to produce disc pads A (Example 1), B (Example 2), C (Example 3), D (Comparative Example 1), E (Comparative Example 2), F (Example 4) and G (Example 5) each having a length of 127 mm.

TABLE 1

|  | Quantity (% by weight) | | |
|---|---|---|---|
| Components | Ex. 1-3, Comp. Ex. 1, 2 | Ex. 4 | Ex. 5 |
| Copper fiber[1] | 20.0 | 20.0 | 20.0 |
| Ceramic fiber[2] | 10.0 | 10.0 | 10.0 |
| Aramid fiber[3] | 5.0 | 5.0 | 5.0 |
| Potassium titanate fiber[4] | 6.0 | 6.0 | 6.0 |
| Phenolic resin[5] | 12.0 | 12.0 | 12.0 |
| NBR powder[6] | 2.5 | 2.5 | 2.5 |
| Graphite[7] | 7.0 | 7.0 | 7.0 |
| Barium sulfate[8] | 22.5 | 22.5 | 22.5 |
| Diantimony trisulfide[9] | 5.0 | 5.0 | 5.0 |
| Cashew dust coated with a liquid IR — Cashew dust[10] Liquid IR[11] | 10.0 | — | — |
| Cashew dust coated with a liquid NBR — Cashew dust[10] Liquid NBR[12] | — | 10.0 | — |
| Cashew dust coated with a liquid SBR — Cashew dust[10] Liquid SBR | — | — | 10.0 |

Copper fiber[1] (produced by Tokyo Seiko Rope Mfg. Co., Ltd., trade name: TAFMIC FIBER, average fiber length: 3 mm, average fiber diameter: 75 μm)
Ceramic fiber[2] (produced by Shinnittetsu Kagaku Kabushiki Kaisha, trade name: SC1400D2, average fiber length: 440 μm, average fiber diameter: 3.6 μm)
Aramid fiber[3] (Kevlar fiber produced by Toray DuPont Co., Ltd., trade name: 1F538, average fiber length: 2 mm, average fiber diameter: 12 μm)
Potassium titanate fiber[4] (produced by Otsuka Kagaku K.K., trade name: TOFICA-YD, average fiber length: 10–20 μm, average fiber diameter: 0.3–0.6 μm)
Phenolic resin[5] (produced by Cashew Co., Ltd., trade name: No. 2021)
NBR powder[6] (produced by Nippon Zeon Co., Ltd.. trade name: NIPPOL 1411, average particle size: 32 μm)
Graphite[7] (produced by Nippon Kokuen Kabushiki Kaisha, trade name: CB150, average particle size: 30 μm)
Barium sulfate[8] (produced by Sakai Chemical Industry Co., Ltd., trade name: B · C, average particle size: 10 μm)
Diantimony trisulfide[9] (produced by Nippon Seiko K.K., trade name: P-3, average particle size: 15 μm)
Cashew dust[10] (produced by Cashew Co., Ltd., trade name: H101, average particle size: 170 μm)
Liquid IR[11] (produced by Kuraray Co., Ltd., trade name: LIR-30)
Liquid NBR[12] (produced by Nippon Zeon Co., Ltd., trade name: NIPOL 1312)

The friction material compositions A, B, C, F and G of the invention and the comparative friction material compositions D and E, the disc pads A, B, C, F and G of the invention and the comparative disc pads D and E were tested for comparison. The results of the tests are given in Tables 2 and 3. The tests were carried out as follows:

(1) Evaluation of the Dropping of Cashew Dust

The friction material compositions A, B, C, D, E, F and G were put into a polyethylene bag individually and shaken ten times, and the weight of the cashew dust dropped off to the bottom of the bag was measured.

(2) Evaluation of the Durability of the Adhesive Power of the Cashew Dust Coated with the Liquid IR, Liquid NBR or Liquid SBR The friction material compositions were tested 1 day, 3 days, 10 days, 20 days, 30 days and 50 days after the mixing in the same manner as (1).

TABLE 2

|  | Ex. 1 | Ex. 2 | Ex. 3 | Comp. Ex. 1 | Comp. Ex. 2 | Ex. 4 | Ex. 5 |
|---|---|---|---|---|---|---|---|
| 1 day after mixing | ○ | Δ | ○ | X | ○ | ○ | ○ |
| 3 days after mixing | ○ | Δ | ○ | X | ○ | ○ | ○ |
| 5 days after mixing | ○ | Δ | ○ | X | ○ | ○ | ○ |
| 10 days after mixing | ○ | Δ | ○ | X | ○ | ○ | ○ |
| 20 days after mixing | ○ | Δ | ○ | X | ○ | ○ | ○ |
| 30 days after mixing | ○ | Δ | ○ | X | ○ | ○ | ○ |
| 50 days after mixing | X | X | Δ | X | ○ | X | X |

The mark ○ indicates that a permissible portion, namely at most 1% of the compounded cashew dust coated with the liquid IR, liquid NBR or liquid SBR dropped off.
The mark Δ indicates that a permissible portion, namely at most 3% of the compounded cashed dust coated with the liquid IR, liquid NBR or liquid SBR dropped off.
The mark X indicates that a large portion, namely more than 3% of the compounded cashew dust coated with the liquid IR, liquid NBR or liquid SBR dropped off.

(3) Evaluation of the Local Aggregation of Cashew Dust

The surface of each disc pad was ground by 2 mm, and the ground surface was investigated for the number of the exposed masses of cashew dust.

(4) Evaluation of the Durability of the Adhesive Power of the Cashew Dust Coated with the Liquid IR, Liquid NBR or Liquid SBR:

One day, 3 days, 5 days, 10 days, 20 days, 30 days and 50 days after the mixing, each friction material composition was molded with heat under elevated pressure and treated in the same manner as described above to produce disc pads, which were then evaluated in the same manner as (3).

TABLE 3

|  | Ex. 1 | Ex. 2 | Ex. 3 | Comp. Ex. 1 | Comp. Ex. 2 | Ex. 4 | Ex. 5 |
|---|---|---|---|---|---|---|---|
| 1 day after mixing | ○ | ○ | ○ | ○ | X | ○ | ○ |
| 3 days after mixing | ○ | ○ | ○ | ○ | X | ○ | ○ |
| 5 days after mixing | ○ | ○ | ○ | ○ | X | ○ | ○ |
| 10 days after mixing | ○ | ○ | ○ | ○ | X | ○ | ○ |
| 20 days after mixing | ○ | ○ | ○ | ○ | X | ○ | ○ |
| 30 days after mixing | ○ | ○ | ○ | ○ | X | ○ | ○ |
| 50 days after mixing | ○ | ○ | ○ | ○ | X | ○ | ○ |

The mark ○ indicates the absence of the masses of aggregated cashew dust.
The mark X indicates the presence of the masses of aggregated cashew dust.

The results as given in Tables 2 and 3 indicate that the cashew dust compounded in the friction material compositions A, B, C, F and G of the invention dropped off only in small quantities within an acceptable range, and, after mixing, maintained their adhesive power for 30 days. The disc pads A, B, C, F and G of the invention were free of local aggregation, showing the adhesive power was substantially maintained for 50 days after the mixing. To the contrary, the comparative friction material composition E indicates that excessive liquid IR reduces the dropping of cashew dust, but causes local aggregation of cashew dust in the disc pad E; and the comparative friction material composition D indicates that too little liquid IR causes the dropping of a considerable quantity of cashew dust, but does not cause local aggregation of cashew dust in the disc pad D. That is, using liquid IR beside the range of 3 to 17 parts by weight relative to 100 parts by weight of cashew dust causes damage to either friction material compositions or friction materials produced therefrom.

The disc pads A, B, C, F and G of the invention and the comparative disc pads D and E were tested for the incidence of squealing. The incidence of squealing was determined by driving a 2,000 cc-automatic car with a whole weight of 1,600 kg and a brake of collet type (cylinder area: 28 cm$^2$) a distance of 2,000 km through the streets and by using the following equation. The results are given in Table 4.

$$\text{incidence of squealing } (\%) = \frac{\text{the number of squealing}}{\text{the number of braking}} \times 100$$

TABLE 4

| | | | Incidence of squealing (%) | | | |
|---|---|---|---|---|---|---|
| Ex. 1 | Ex. 2 | Ex. 3 | Comp. Ex. 1 | Comp. Ex. 2 | Ex. 4 | Ex. 5 |
| 0.1 | 0.2 | 0.1 | 0.2 | 0.1 | 1.4 | 1.5 |

The results given in Table 4 show that the disc pads A–E using the liquid IR-coated cashew dusts have low incidence of squealing, while the disc pad E using the liquid NBR-coated cashew dust and the disc pad F using the liquid SBR-coated cashew dust have somewhat higher incidence of squealing.

To compare the combination of a liquid IR and a phenolic resin with the combination of a liquid NBR and a phenolic resin, measurements of the spectra of modulus of elasticity were carried out on the friction materials of the disc pads A and F by using a dynamic viscoelasticity spectrometer (DMA produced by E. I. DuPont de Nemours and Company) at a heating rate of 10° C./min. The results are given in FIG. 1 as a graph. FIG. 1 shows that the friction material using the combination of the liquid IR and the phenolic resin exhibits lower modulus of elasticity at 20 to 200° C. which are ambient temperatures for disc pads, compared with the friction material using the combination of the liquid NBR and the phenolic resin.

Thus it was confirmed that coating cashew dust with 3 to 17 parts by weight of liquid IR relative to 100 parts by weight of the cashew dust is particularly effective in reducing the dropping of cashew dust to a permissible degree and preventing local aggregation of cashew dust.

It was also confirmed that although the effect described above is obtainable by using other liquid rubbers than liquid IR in the same range of quantity, liquid IR is the best one because it also reduces the incidence of brake squealing, which is another problem incident to brakes.

What is claimed is:

1. A friction material composition, comprising
   (a) a fibrous material,
   (b) a binder containing a liquid rubber and
   (c) a friction regulator containing cashew dust, the cashew dust being coated with 3 to 17 parts by weight of the liquid rubber relative to 100 parts by weight of the cashew dust.

2. The friction material composition of claim 1, which contains 3 to 30% by weight of the cashew dust coated with the liquid rubber, based on the whole quantity of the friction material composition.

3. The friction material composition of claim 1, wherein the liquid rubber has a coefficient of viscosity of 10 to 2,000 Pa·s as measured at 20° C.

4. The friction material composition of claim 1, wherein the liquid rubber is liquid isoprene rubber.

5. The friction material composition of claim 1, wherein the binder comprises a thermosetting resin and the liquid rubber, and the friction regulator comprises an inorganic friction regulator and an organic friction regulator comprising the cashew dust.

6. The friction material composition of claim 5, wherein the fibrous material is selected from the group consisting of steel fiber, brass fiber, copper fiber, aramid fiber, acrylic fiber, phenolic fiber, wollastonite fiber, ceramic fiber, rock wool, potassium titanate fiber and carbon fiber, the thermosetting resin is selected from the group consisting of phenolic resin, epoxy resin, melamine resin and cashew resin, the liquid rubber is selected from the group consisting of liquid isoprene rubber, liquid nitrile-butadiene rubber, liquid styrene-butadiene rubber, liquid acrylic rubber, liquid natural rubber and liquid chloroprene rubber, the inorganic friction regulator is selected from the group consisting of barium sulfate, graphite, diantimony trisulfide, zeolite, mica, zirconia, silica, alumina, calcium carbonate and magnesium carbonate, and the organic friction regulator comprises the cashew dust and rubber dust.

7. The friction material composition of claim 5, wherein the fibrous material is 30 to 50% by weight, the binder is 10 to 18% by weight, the organic friction regulator is 3 to 18% by weight, and the inorganic friction regulator is 25 to 45% by weight, based on the whole quantity of the friction material composition.

8. The friction material composition of claim 7, wherein the fiber material comprises copper fiber, ceramic fiber, aramid fiber and potassium titanate fiber, the binder comprises phenolic resin and the liquid rubber selected from liquid isoprene rubber, liquid nitrile-butadiene rubber, and liquid styrene-butadiene rubber, and the friction regulator comprises the cashew dust, nitrile-butadiene rubber dust, graphite, barium sulfate and diantimony trisulfide.

9. A method of producing a friction material composition comprising (a) a fibrous material, (b) a binder containing a liquid rubber and (c) a friction regulator containing cashew dust, comprising coating the cashew dust with the liquid rubber, adding the fibrous material, remaining binder other than the liquid rubber and remaining friction regulator other than the cashew dust to the cashew dust coated with the liquid rubber, and then mixing.

10. The method of claim 9, wherein 100 parts by weight of the cashew dust is coated with 3 to 17 parts by weight of the liquid rubber.

11. The method of claim 9, wherein the friction material composition contains 3 to 30% by weight of the cashew dust coated with the liquid rubber, based on the whole quantity of the friction material composition.

12. The method of claim 9, wherein the liquid rubber has a coefficient of viscosity of 10 to 2,000 Pa·s as measured at 20° C.

13. The method of claim 9, wherein the liquid rubber is liquid isoprene rubber.

14. The method of claim 9, wherein the binder comprises a thermosetting resin and the liquid rubber, and the friction regulator comprises an inorganic friction regulator and an organic friction regulator comprising the cashew dust.

15. The method of claim 14, wherein the fibrous material is selected from the group consisting of steel fiber, brass fiber, copper fiber, aramid fiber, acrylic fiber, phenolic fiber, wollastonite fiber, ceramic fiber, rock wool, potassium titanate fiber and carbon fiber, the thermosetting resin is selected from the group consisting of phenolic resin, epoxy resin, melamine resin and cashew resin, the liquid rubber is selected from liquid isoprene rubber, liquid nitrile-butadiene rubber, liquid styrene-butadiene rubber, liquid acrylic rubber, liquid natural rubber and liquid chloroprene rubber, the inorganic friction regulator is selected from the group consisting of barium sulfate, graphite, diantimony trisulfide, zeolite, mica, zirconia, silica, alumina, calcium carbonate and magnesium carbonate, and the organic friction regulator comprises the cashew dust and rubber dust.

16. The method of claim 14, wherein the friction material composition comprises 30 to 50% by weight of the fibrous material, 10 to % 18 by weight of the binder, 3 to 18% by weight of the organic friction regulator, and 25 to 45% by weight of the inorganic friction regulator, based on the whole quantity of the friction material composition.

17. The method of claim 16, wherein the fiber material comprises copper fiber, ceramic fiber, aramid fiber and potassium titanate fiber, the binder comprises phenolic resin and the liquid rubber selected from liquid isoprene rubber, liquid nitrile-butadiene rubber and liquid styrene-butadiene rubber, and the friction regulator comprises the cashew dust, nitrile-butadiene rubber dust, graphite, barium sulfate and diantimony trisulfide.

* * * * *